(12) United States Patent
Werdecker et al.

(10) Patent No.: US 11,255,440 B2
(45) Date of Patent: Feb. 22, 2022

(54) GAS-LUBRICATED MECHANICAL SEAL HAVING IMPROVED SOILING PROTECTION

(71) Applicant: EagleBurgmann Germany GmbH & Co. KG, Wolfratshausen (DE)

(72) Inventors: Ferdinand Werdecker, Walchensee (DE); Andreas Schrufer, Wolfratshausen (DE); Andreas Fesl, Otterfing (DE); Josef Strobl, Rottach-Egern (DE); Giuliano Rossi, Ismaning (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 144 days.

(21) Appl. No.: 16/756,322

(22) PCT Filed: Oct. 1, 2018

(86) PCT No.: PCT/EP2018/076680
§ 371 (c)(1),
(2) Date: Apr. 15, 2020

(87) PCT Pub. No.: WO2019/081166
PCT Pub. Date: May 2, 2019

(65) Prior Publication Data
US 2020/0278030 A1  Sep. 3, 2020

(30) Foreign Application Priority Data

Oct. 26, 2017 (DE) .................... 10 2017 219 190.2

(51) Int. Cl.
*F16J 15/34* (2006.01)
*F04D 29/12* (2006.01)

(52) U.S. Cl.
CPC ....... *F16J 15/3464* (2013.01); *F16J 15/3404* (2013.01); *F04D 29/124* (2013.01);
(Continued)

(58) Field of Classification Search
CPC ...... F16J 15/34; F16J 15/3436; F16J 15/3472; F16J 15/348; F16J 15/3464; F16J 15/3404; F16J 15/3492; F16J 15/3496
See application file for complete search history.

(56) References Cited

U.S. PATENT DOCUMENTS 8,128,097 B2 * 3/2012 Yasu ..................... F16J 15/348
                                                                277/375
9,010,764 B2 * 4/2015 Hoffmann ............ F16J 15/3476
                                                                277/377
(Continued)

FOREIGN PATENT DOCUMENTS

DE       3533829 A1    4/1987
DE   39 42 408 C2    12/1993
(Continued)

OTHER PUBLICATIONS

Japanese Examination Report dated Mar. 11, 2021, issued during the prosecution of Japanese Patent Application No. JP 2020-522312.
(Continued)

*Primary Examiner* — Gilbert Y Lee
(74) *Attorney, Agent, or Firm* — Locke Lord LLP; Scott D. Wofsy

(57) ABSTRACT

The invention relates to a gas-lubricated mechanical seal arrangement using a gaseous fluid as a barrier medium, comprising a mechanical seal comprising a rotating slide ring (2) and a stationary slide ring (3) defining a seal gap (4) therebetween, a biasing means (5) biasing the stationary slide ring (3) towards the rotating slide ring (2), a fluid space (6), into which the gaseous fluid can be introduced, a first slide ring carrier (20) for retaining the rotating slide ring (2), the first slide ring carrier (20) having a first axial surface (21), a second slide ring carrier (30) for retaining the stationary slide ring (3), the second slide ring carrier (30) having a second axial surface (31), the second slide ring (30)

(Continued)

Figure 1:
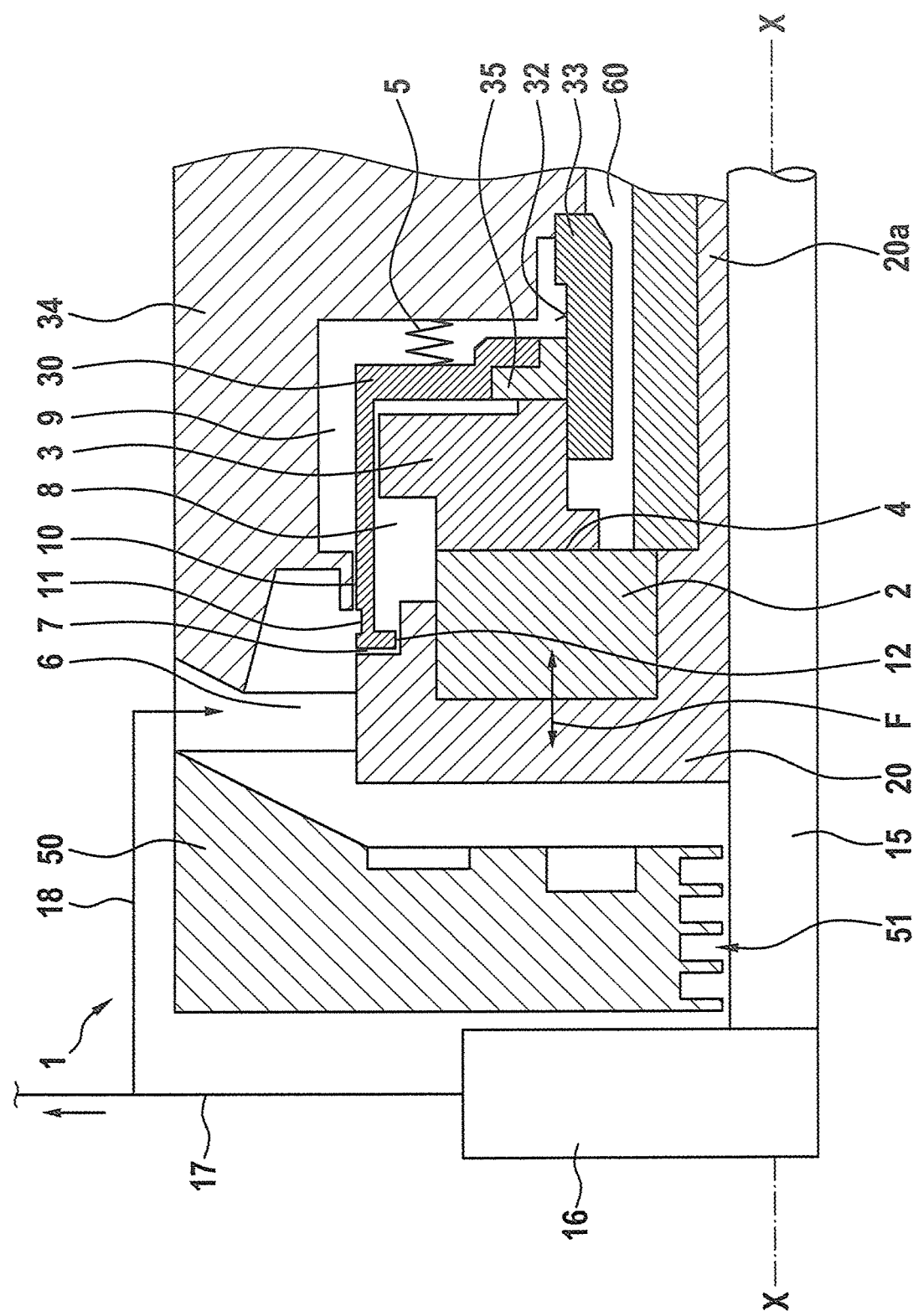

and the stationary slide ring (3) being arranged together on a displacement surface (32) so as to be displaceable in the axial direction (X-X), an axial gap (7), which is limited by the first axial surface (21) and the second axial surface (31), and an antechamber (8) which is formed at the sealing gap (4) of the mechanical seal and which is connected to the fluid space (6) via the axial gap (7).

12 Claims, 4 Drawing Sheets

(52) U.S. Cl.
CPC ....... *F05B 2240/57* (2013.01); *F16J 15/3492* (2013.01); *F16J 15/3496* (2013.01)

(56) References Cited

U.S. PATENT DOCUMENTS

| | | | |
|---|---|---|---|
| 2002/0047240 A1* | 4/2002 | Radosav | F16J 15/348 277/389 |
| 2006/0290067 A1 | 12/2006 | Dahlheimer | |
| 2011/0084454 A1 | 4/2011 | Quarmby et al. | |
| 2013/0011256 A1 | 1/2013 | Holzapfel et al. | |

FOREIGN PATENT DOCUMENTS

| | | |
|---|---|---|
| DE | 20 20 1000 0954 U1 | 6/2010 |
| EP | 1213516 A1 | 6/2002 |
| GB | 2285101 A | 6/1995 |
| JP | 2006-291988 A | 10/2006 |
| JP | 2007263345 A | 10/2007 |
| JP | 2016113988 A | 6/2016 |
| WO | 2004/029489 | 4/2004 |
| WO | 2014142265 A1 | 9/2014 |

OTHER PUBLICATIONS

International Search Report issued in PCT/EP2018/076680, dated Jan. 16, 2019.

* cited by examiner

GAS-LUBRICATED MECHANICAL SEAL HAVING IMPROVED SOILING PROTECTION

CROSS-REFERENCE TO RELATED APPLICATIONS

This application is a U.S. National Phase Application filed under 35 U.S.C. § 371, based on International Patent Application No. PCT/EP2018/076680, filed Oct. 1, 2018, which claims priority to German Patent Application No. 10 2017 219 190.2, filed on Oct. 26, 2017. The entire contents of these applications is incorporated herein by reference in their entireties.

The invention relates to a gas-lubricated mechanical seal arrangement, which uses a gaseous fluid as a barrier medium, the mechanical seal arrangement having improved soiling protection.

Gas-lubricated mechanical seals are used, for example, in compressors to seal a drive shaft of the compressor. A gaseous fluid, such as air or nitrogen, is used as a barrier medium for sealing the sealing gap between the rotating and stationary mechanical slide rings in gas-lubricated mechanical seals. During operation of the mechanical seal arrangement, dirt particles in the form of small solids or the like can enter the seal gap and damage the sliding surfaces of the rotating and/or stationary slide ring. This will reduce the life of the mechanical seal.

Therefore, it is the object of the present invention to provide a mechanical seal arrangement which provides improved protection against soiling while being of simple design and easy and inexpensive to manufacture. Furthermore, it is the object of the invention to provide a compressor comprising a mechanical seal arrangement having extended service life.

This object will be solved by a mechanical seal arrangement having the features of claim 1 and a compressor having the features of claim 11. The respective subclaims show preferred further developments of the invention.

The gas-lubricated mechanical seal arrangement having the features of claim 1 according to the invention has the advantage that improved soiling protection will be achieved, so that introduction of solid particles such as dust or small particles or the like into a sealing gap between a rotating mechanical seal and a stationary slide ring can be avoided. In this way, significantly safer operation of the mechanical seal arrangement can be achieved, which also increases the service life of the mechanical seal arrangement. According to the invention, this will be a accomplished in that the gas-lubricated mechanical seal arrangement comprises a rotating slide ring and a stationary slide ring defining the seal gap therebetween. Furthermore, a biasing device is provided which biases the stationary slide ring in the direction of the rotating slide ring. Furthermore, a fluid chamber is provided into which a gaseous fluid can be introduced, wherein the gaseous fluid is used as a barrier medium for the mechanical seal and is introduced into the seal gap. Furthermore, the mechanical seal arrangement comprises a first slide ring carrier for retaining the rotating slide ring, wherein the first slide ring carrier comprises a first axial surface, and a second slide ring carrier for retaining the stationary slide ring, the second slide ring carrier comprising a second axial surface. The second slide ring carrier and the stationary slide ring both are slidably arranged together on a sliding surface in the axial direction of the mechanical seal arrangement. Furthermore, an axial gap is limited by the first and second axial surface. The axial gap is oriented perpendicular to a central axis of the mechanical seal arrangement. Furthermore, an antechamber is formed at the seal gap of the mechanical seal, the antechamber being coupled to the fluid chamber via the axial gap. Thus, by providing the additional axial gap in a flow path of the gaseous fluid from the fluid chamber towards the seal gap, dirt particles that can be present in the gaseous fluid are prevented from reaching the seal gap. As the first slide ring carrier, which holds the rotating slide ring, rotates together with the rotating slide ring, ingress of solids into the axial gap is made considerably more difficult during operation of the mechanical seal arrangement, as centrifugal forces are essentially generated outwards by the rotation, causing dirt particles or the like to be tossed away from the axial gap. This makes it much more difficult for solid particles to move in the direction of the sealing gap.

Still preferably, the mechanical seal arrangement comprises a sleeve, which has a cylindrical exterior surface forming the displacement surface, on which the second slide ring carrier and the stationary slide ring are arranged to be jointly displaceable in axial direction. Alternatively, it is preferred that the sliding surface can as well be arranged on a housing.

Still preferably, the mechanical seal arrangement comprises a pressure-compensating chamber, which is connected to the fluid chamber via a first radial gap. Pressure compensating can occur on the stationary slide ring through the pressure-compensating chamber. In this way, any pressure built up in the seal gap can be kept low, especially when the mechanical seal is started from standstill.

Still preferably, the mechanical seal arrangement comprises a protective edge, which is located radially outside and above the axial gap. This additionally prevents solid particles, which can be present in the gaseous fluid serving as barrier medium, from reaching the seal gap of the mechanical seal. The protective edge is preferably provided on the first slide ring carrier or on the second first slide ring carrier or both the first and second first slide ring carriers.

According to another preferred embodiment of the present invention, a ratio of a length L of the axial gap to a width B of the axial gap is greater than or equal to 2:1. This ensures that the length of the axial gap is always significantly greater than the width, making it more difficult for solid particles to penetrate into the axial gap.

Preferably, the mechanical seal arrangement also includes a drain channel, which is arranged on an outer circumference of the second slide ring carrier. The drain channel ensures that, when the device in which the mechanical seal arrangement is located is at a standstill, a medium, in particular a condensate deriving from the gaseous fluid, can drain down along the outer circumference in the drain channel. In this way, the condensate can safely be drained, for example through an outlet.

A spring element is particularly preferred for biasing the stationary slide ring towards the rotating slide ring. The spring element can easily and inexpensively be provided. The spring element is preferably arranged between a housing and the second slide ring carrier, which holds the stationary slide ring.

Moreover, the pressure-compensating chamber has the advantage that in the event of axial movements of a rotating shaft on which the rotating slide ring is arranged, for example via a shaft sleeve or directly, the stationary slide ring can immediately be moved forward. Since the axial gap between the first and second axial surface is formed on the first and second slide ring carrier, contact at the axial gap between the first and second slide ring carrier will be avoided even in the event of axial movement of the rotating slide ring as a result of a shock or the like. The axial gap can also be maintained during operation in any operating situation.

For a particularly simple and compact embodiment, the second slide ring carrier preferably has a cup-shaped shape. Furthermore, the mechanical seal arrangement preferably comprises an auxiliary seal, which seals against the sliding surface. Therefore, the auxiliary seal is preferably configured such that combined movement on the sliding surface with the second slide ring carrier and the stationary mechanical seal is possible.

According to another preferred embodiment of the invention, a second radial gap is arranged between the axial gap and the antechamber at the sealing gap of the mechanical seal. The second radial gap represents another safety device against solid particles contamination of the sealing gap. Thus, the mechanical seal arrangement can even be more protected against dirt.

It is particularly preferred for a second width of the radial gap to be equal to a first width of the axial gap.

Furthermore, the present invention relates to a compressor for compressing a gaseous fluid, comprising a mechanical seal arrangement according to the present invention. Preferably, the compressor is a radial compressor. Gaseous fluid, which has been compressed by the compressor, is particularly preferred to be branched and fed to the fluid chamber. Thus, the gaseous fluid already present at the compressor can also be used as a barrier medium for operating the mechanical seal arrangement. A separate barrier fluid supply is not necessary for this. Thus, there is a higher risk of contamination of the gaseous fluid. It should be noted, however, that it can also be intended for the gaseous fluid used as sealing medium in the mechanical seal to be provided by a separate sealing medium circuit.

Figure 2:
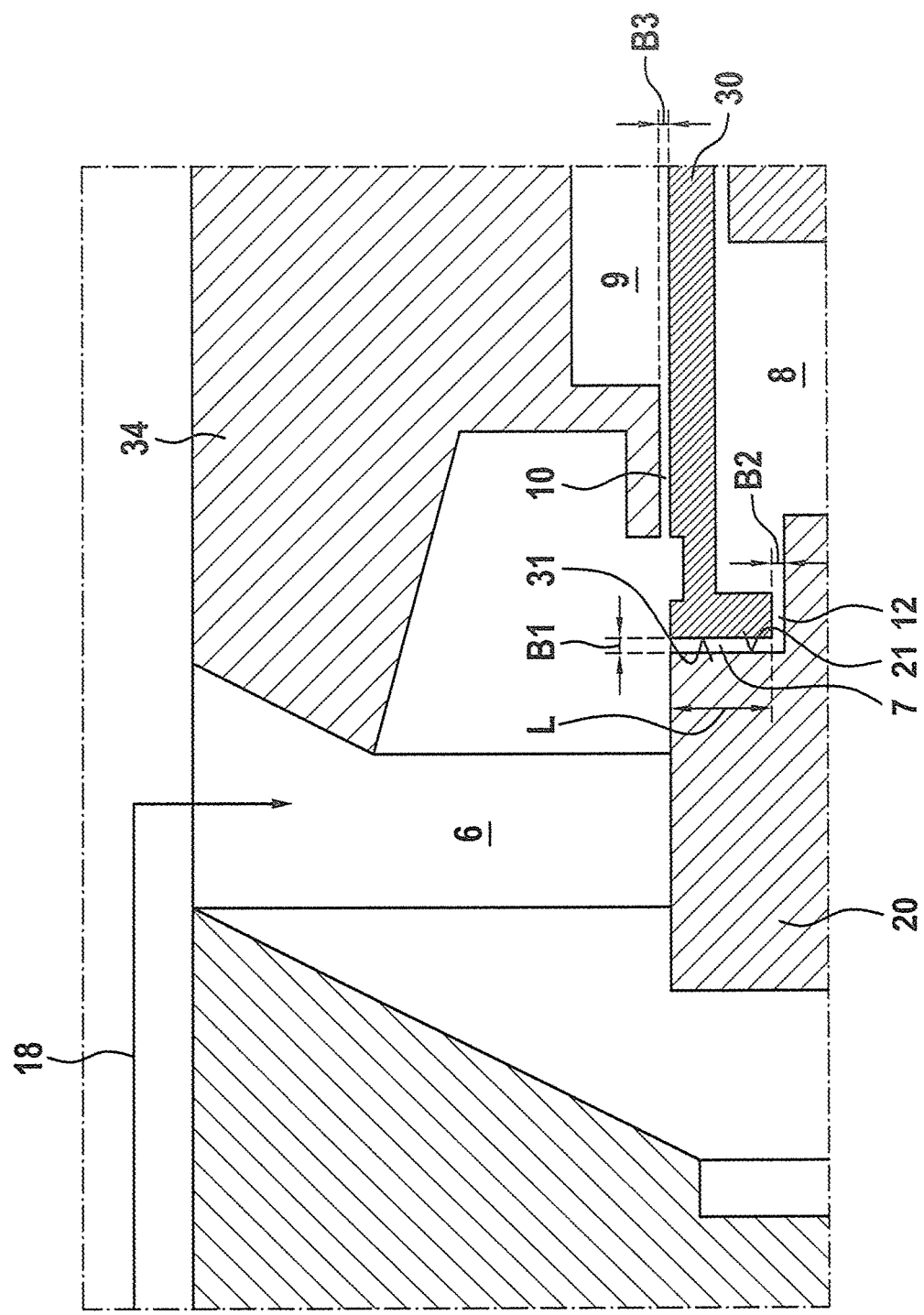
Figure 3:
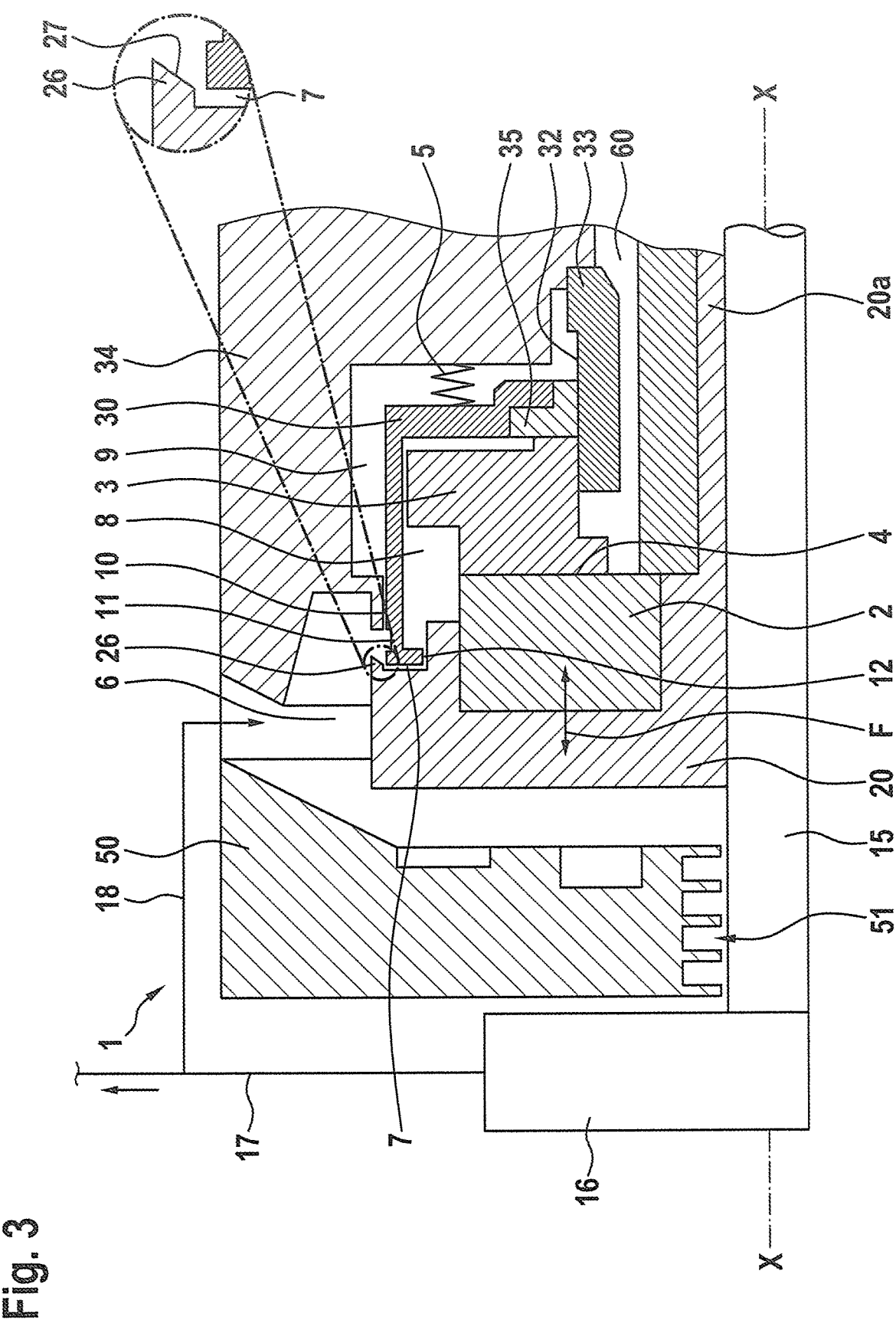
Figure 4:
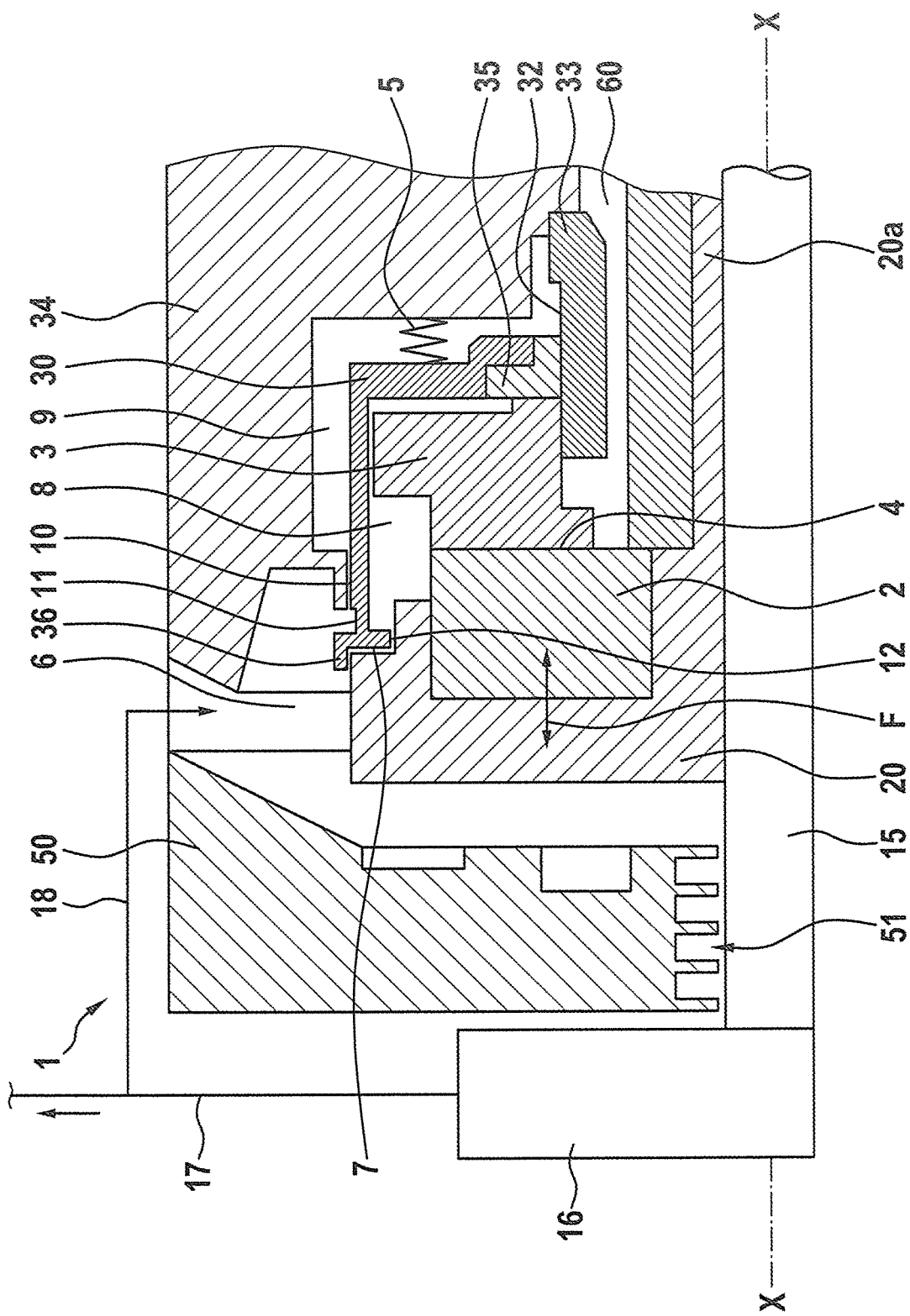

In the following, preferred embodiments of the invention will be described in detail while making reference to the accompanying drawing, wherein:

FIG. 1 is a schematic sectional view of a compressor comprising a gas-lubricated mechanical seal arrangement according to a first embodiment of the invention, FIG. 2 is an enlarged partial sectional view of the mechanical seal arrangement of FIG. 1, FIG. 3 is a schematic view of a compressor comprising a mechanical seal arrangement according to a second embodiment of the invention, and FIG. 4 is a schematic view of a compressor comprising a mechanical seal arrangement according to a third embodiment of the invention.

Referring now to FIGS. 1 and 2, a mechanical seal arrangement 1 according to a first preferred embodiment of the invention is described in detail below. The mechanical seal arrangement 1 seals a fluid chamber 6 against an atmosphere 60.

As can be seen in FIG. 1, the mechanical seal 1 is arranged on a rotating shaft 15 and seals a compressor 16. The compressor compresses a gaseous fluid, which is fed to a consumer via a discharge line 17. A branch line 18 branches off from the discharge line 17 and leads to a fluid chamber 6 at the mechanical seal arrangement 1.

The mechanical seal arrangement 1 comprises a mechanical seal comprising a rotating slide ring 2 and a stationary slide ring 3, which define a seal gap 4 therebetween.

The mechanical seal seals the fluid chamber 6 against the atmosphere 60.

The rotating mechanical seal 2 is retained by a first slide ring carrier 20. The first slide ring carrier 20 is directly fixed to the shaft 15 via a sleeve portion 20a. The first slide ring carrier 20 partially surrounds the rotating slide ring 2. The stationary slide ring 3 is retained by a second slide ring carrier 30. Herein, a ring-shaped auxiliary seal member 35 is provided, which is arranged between the second slide ring carrier 30 and the stationary slide ring 3.

As can be seen from FIG. 1, the stationary slide ring 3 and the auxiliary seal member 35 are slidingly arranged on a displacement surface 32 of a sleeve 33. The sleeve 33 is rigidly fixed on the housing 34. In this embodiment, the displacement surface 32 is a cylindrical surface, which allows axial adjustment of the stationary slide ring 3 during axial movements of the rotating slide ring 2.

The stationary slide ring 3 is preloaded in axial direction X-X against the rotating slide ring 2 by means of a biasing device 5, which, in this embodiment, is a spring element. The biasing device 5 is arranged between the housing 34 and the stationary second slide ring carrier 30.

As can further be seen from FIG. 1, an antechamber 8 is arranged adjacent to the seal gap 4. Furthermore, a pressure compensating chamber 9 is also provided which extends towards the rear side of the second slide ring carrier 30, as can be seen from FIG. 1. In this embodiment, the biasing device 5 is arranged in the pressure-compensating chamber 9.

The antechamber 8 is connected to the fluid chamber 6 via an axial gap 7. The axial gap 7 can be seen in detail in FIG. 2. The axial gap 7 is formed of a first axial surface 21 of the first slide ring carrier 20 and a second axial surface 31 of the stationary second slide ring carrier 30. The axial gap 7 has a first width B1. Furthermore, the axial gap 7 has a length L in the radial direction. Thus, the axial gap 7 defines a distance between the first axial surface 21 and the second axial surface 31, which is always greater than the sealing gap 4 between the rotating and stationary slide rings.

A ratio of the length L to the first width B1 of the axial gap 7 is greater than or equal to 2. As can be seen from FIG. 2, the axial gap 7 is exclusively formed in the radial direction towards the axial direction X-X.

As can further be seen in FIGS. 1 and 2, a first radial gap 10 is also provided between the fluid chamber 6 and the pressure-compensating chamber 9. The first radial gap 10 has a constant width B3. This width B3 is preferably smaller than the second width B2 of the radial gap 12. The width B3 is as small as possible so as to minimize a flow of the fluid into the pressure-compensating chamber 9 and to achieve extensive decoupling of the pressure-compensating chamber 9 from the fluid chamber 6. In particular, this prevents dirt particles or the like from entering the pressure-compensating chamber 9.

Furthermore, a second radial gap 12 is provided in the fluid path from the fluid chamber 6 to the antechamber 8, which has a constant second width B2 along the axial direction X-X. The second width B2 is equal to the first width B1 of the axial gap 7.

As can further be seen from FIG. 1, the axial gap 7 is offset in axial direction X-X in relation to the sealing gap 4.

Thus, the antechamber 8 is connected to the fluid chamber 6 via the second radial gap 12 and the axial gap 7.

As both the axial gap 7 and the second radial gap 12 are formed between the first slide ring carrier 20 and the second slide ring carrier 30, manufacture of this gap arrangement is particularly cost-effective.

During operation, due to certain operating situations, axial relative movements can now act on the mechanical seal arrangement 1, especially due to thermal expansion of the shaft 15, which can lead to relative movements in the axial direction between the shaft 15 and the housing 34. In this case, the rotating slide ring 2, which is connected to the shaft 15 via the first slide ring carrier 20, can perform an axial movement F in the axial direction X-X, which is directed towards the compressor 16, for example. This would increase the seal gap 4 between the rotating slide ring 2 and the stationary slide ring 3. However, due to the pressure compensating chamber 9 and the biasing device 5 arranged therein as well as the displacement surface 32 on the sleeve 33, the stationary slide ring 3 now can immediately follow the movement of the rotating slide ring 2 and also move in the direction of axial displacement of the rotating slide ring 2. As a result, the sealing gap 4 remains constant. As the axial gap 7 is formed of the two components of the first and second slide ring carriers 20, 30, contact between the first and second axial surfaces 21, 31, which form the axial gap 7, can be prevented, as the slide ring carriers 20, 30 move together with the slide rings 2, 3.

As the first width B1 is always greater than a width of the seal gap 4, no contact between the first axial surface 21 and the second axial surface 31 would occur even if the rotating slide ring 2 were to move axially towards the stationary slide ring 3, as contact of the seal faces would first occur at the rotating slide ring 2 and at the stationary slide ring 3. Therefore, contact between the first axial surface 21 and the second axial surface 31 cannot occur in any operating condition, so that the axial gap 7 is always present regardless of a particular operating situation.

Furthermore, a drain channel 11 is formed on an outer circumference of the stationary second slide ring carrier 30. The drain channel 11 is guided over at least half the circumference of the second slide ring carrier 30, preferably over the entire circumference of the slide ring carrier 30. The drain channel 11 is used to drain condensate, which, during various operating situations, can condense from the gaseous fluid. The condensate can be guided downwards via the drain channel 11 to a region of the mechanical seal arrangement where a drain or the like is provided.

As it is further shown in FIG. 1, a seal component 50 including a labyrinth seal 51 is arranged between the compressor 16 and the mechanical seal arrangement 1 on the shaft 15.

Thus, by providing the axial gap 7, any contamination of the antechamber 8 and especially of the seal gap 4 between the rotating and stationary mechanical slide rings 2, 3 and the back of the mechanical slide rings can now be avoided. Provision of the axial gap 7 prevents solid particles or liquid droplets, which could be present in the gaseous fluid branched off from the discharge line, from moving as far as to sealing gap 4. As during operation the first slide ring carrier 20 rotates together with the rotating shaft 15 and the rotating slide ring 2, there is also a radially outwardly directed flow at axial gap 7, which additionally causes solids to be carried away from axial gap 7. Herein, the axial gap 7 is also maintained during those operating cases in which axial movement of the slide rings occurs. Even in such a case it can be avoided for solids to reach the antechamber 8. This significantly extends the service life of the mechanical seal arrangement for gas-lubricated mechanical seals.

FIG. 3 shows a mechanical seal arrangement 1 and a compressor 16 according to a second embodiment of the invention.

Contrary to the first embodiment, the second embodiment additionally comprises a protective edge 26 arranged on the rotating first slide ring carrier 20. As can be seen from FIG. 3, the protective edge 26 is arranged radially outside above the axial gap 7. This provides an additional device which prevents dirt from entering the axial gap 7 and, if necessary, the antechamber 8 and in particular the sealing gap 4. The protective edge 26 comprises a bevel 27, which faces the axial gap 7. This prevents contamination to the protective edge 26. This makes the mechanical seal arrangement 1 according to the second embodiment even more resistant to dirt, which further increases the service life of the mechanical seal arrangement.

FIG. 4 shows a mechanical seal arrangement 1 and a compressor 16 according to a third embodiment of the invention. Contrary to the second embodiment, the third embodiment comprises a protective edge 36 arranged on the stationary second slide ring carrier 30. As in the second embodiment, the protective edge 36 is arranged radially outside and above the axial gap 7. The function thereof is the same as in the second embodiment, so that it can reliably be prevented that dirt particles can get into the antechamber 8 and in particular to the sealing gap between the rotating and the stationary slide rings.

LIST OF REFERENCE NUMBERS 1 mechanical seal arrangement
2 rotating slide ring
3 stationary slide ring
4 seal gap
5 biasing device
6 fluid chamber
7 axial gap
8 antechamber
9 pressure compensating chamber
10 first radial gap
11 drain channel
12 second radial gap
15 shaft
16 compressor
17 discharge line
18 branch line
20 first slide ring carrier
20a sleeve portion
21 first axial surface
26 protective edge
27 bevel
30 second slide ring carrier
31 second axial surface
32 displacement surface
33 sleeve
34 housing
35 auxiliary seal member
36 protective edge
50 seal component
51 labyrinth seal
60 atmosphere
B1 first width
B2 second width
B3 third width
F axial movement
L length
X-X axial direction

The invention claimed is:

1. A gas-lubricated mechanical seal arrangement using a gaseous fluid as a barrier medium, comprising:
a mechanical seal having a rotating slide ring and a stationary slide ring defining a seal gap therebetween,
a biasing device which biases the stationary slide ring in the direction of the rotating slide ring,
a fluid chamber into which a gaseous fluid can be introduced, a first slide ring carrier for retaining the rotating slide ring, wherein the first slide ring carrier has a first axial surface, a second slide ring carrier for retaining the stationary slide ring, the second slide ring carrier having a second axial surface, wherein the second slide ring carrier and the stationary slide ring are arranged together on a displacement surface so as to be displaceable in an axial direction, an axial gap which is limited by the first axial surface and the second axial surface, and an antechamber which is formed at the sealing gap of the mechanical seal and which is connected to the fluid chamber via the axial gap.

2. The mechanical seal arrangement according to claim 1, further comprising a sleeve having a cylindrical exterior surface forming the displacement surface.

3. The mechanical seal according to claim 1, further comprising a pressure-compensating chamber which is coupled to the fluid chamber via a first radial gap.

4. The mechanical seal arrangement according to claim 1, further comprising a protective edge arranged radially outwardly above the axial gap.

5. The mechanical seal arrangement according to claim 4, wherein the protective edge is provided on the first slide ring carrier or on the second slide ring carrier.

6. The mechanical seal arrangement according to claim 1, wherein a ratio of a length of the axial gap to a width of the axial gap is greater than or equal to 2:1.

7. The mechanical seal arrangement according to claim 1, further comprising a drain channel disposed on an outer periphery of the second slide ring carrier.

8. The mechanical seal arrangement according to claim 1, wherein said second slide ring carrier has a cup-shaped configuration.

9. The mechanical seal arrangement according to claim 1, wherein a second radial gap is disposed between the axial gap and the antechamber.

10. The mechanical seal arrangement according to claim 9, wherein a second width of said second radial gap is equal to a width of said axial gap.

11. A compressor for compressing a gaseous medium, comprising a mechanical seal arrangement according to claim 1.

12. The compressor according to claim 11, further comprising a branch line leading from a discharge line of the compressor to the fluid chamber for supplying gaseous medium from the discharge line to the fluid chamber.

* * * * *